United States Patent [19]
Jain et al.

[11] Patent Number: 5,425,240
[45] Date of Patent: Jun. 20, 1995

[54] PURIFICATION OF OXYGEN BY CRYOGENIC ADSORPTION

[75] Inventors: Ravi Jain, Piscataway; Alberto LaCava, South Plainfield, both of N.J.

[73] Assignee: The BOC Group, Inc., New Providence, N.J.

[21] Appl. No.: 955,521

[22] Filed: Oct. 1, 1992

[51] Int. Cl.⁶ .................................................. F25J 3/00
[52] U.S. Cl. ........................................ 62/18; 62/24; 95/106; 96/126; 96/130
[58] Field of Search ................. 62/18, 24; 95/106; 96/121, 126, 130

[56] References Cited

U.S. PATENT DOCUMENTS

| | | | |
|---|---|---|---|
| 3,967,464 | 7/1976 | Cormier et al. | 62/18 |
| 4,746,332 | 5/1988 | Tomomura et al. | 62/18 |
| 4,952,223 | 8/1990 | Kirshnamurthy et al. | 62/18 |
| 4,957,523 | 9/1990 | Zarate et al. | 62/18 |

*Primary Examiner*—Ronald C. Capossela
*Attorney, Agent, or Firm*—Coleman R. Reap; Larry R. Cassett

[57] ABSTRACT

Apparatus and a process for producing high purity oxygen containing not more than 1 ppm by volume of hydrocarbons. An oxygen stream containing up to about 100 ppm by volume of hydrocarbons is subjected to cryogenic temperature swing adsorption in an adsorption bed containing calcium-exchanged type X zeolite, type 5A zeolite or 13X zeolite, for the removal of the hydrocarbons and any nitrogen present in the oxygen stream.

22 Claims, 3 Drawing Sheets

PURIFICATION OF OXYGEN BY CRYOGENIC ADSORPTION

BACKGROUND OF THE INVENTION

This invention relates to the purification of oxygen, and more particularly to the removal of low molecular weight hydrocarbons from an oxygen stream by adsorption at cryogenic temperatures.

Oxygen produced by conventional techniques such as the cryogenic distillation of air generally contains small amounts of low molecular weight hydrocarbons, such as methane, ethane, etc. For certain oxygen-consuming industrial processes, such as ozone production, it is important that the oxygen used as feed to the ozonizer be substantially free of hydrocarbons because hydrocarbons are converted to moisture and carbon dioxide in ozonizers, and the efficiency of ozonizers falls off rapidly as the dew point of the feed gas to the ozonizers increases.

Hydrocarbons can be removed from the oxygen feed stream to an ozonizer by various chemical or physical techniques. For instance, it is known to remove hydrocarbons from an oxygen stream by cryogenic distillation. This procedure requires the use of expensive equipment, such as distillation columns, heat exchangers, etc., which significantly increases the cost of the hydrocarbon-free oxygen product.

Hydrocarbons can also be removed from oxygen streams by reacting the hydrocarbons with oxygen over a suitable catalyst, such as platinum, thereby forming water and carbon dioxide. However, catalytic oxidation of the hydrocarbons is carried out at relative high temperatures, for example at temperatures up to about 400° C. or higher; accordingly a significant quantity of energy is, expended in raising the temperature of the crude oxygen product to the reaction temperature. Furthermore, as noted above, the oxidation of hydrocarbons results in the production of significant amounts of moisture; accordingly, if it is desired to use this oxygen for ozone production, it is necessary to remove any water formed during the oxidation reaction prior to ozonization, or else settle for low ozone production efficiency.

U.S. Pat. No. 4,746,332 discloses the adsorption of oxygen from a nitrogen stream at cryogenic temperatures using sodium-exchanged A zeolite.

Because of the increasing need for hydrocarbon-free oxygen supplies, continuous efforts are being made to develop inexpensive and efficient processes for the removal of hydrocarbons from oxygen streams. The present invention provides such a process. The process of the invention can also effect the removal of other undesired gas components, such as nitrogen, from oxygen streams.

SUMMARY OF THE INVENTION

In a broad embodiment of the invention, high purity oxygen, i.e. oxygen containing no more than about 1 ppm by volume each of hydrocarbons and nitrogen, is produced by subjecting an oxygen stream containing hydrocarbons and perhaps nitrogen as impurities to cryogenic temperature swing adsorption (TSA). The adsorption is generally carried out in the gaseous phase, i.e. at temperatures between the dew point of oxygen at the pressure prevailing in the adsorption vessel and about 150° K. and absolute pressures in the range of about 1.0 to 20.0 atmospheres. In preferred embodiments the adsorption is carried out at temperatures in the range of about 90° to 150° K.

The adsorption is conducted in a bed comprising an adsorbent which preferentially adsorbs hydrocarbons and nitrogen from the oxygen stream. Suitable adsorbents for use in the process of the invention include type A, X and Y type zeolites, mordenite, etc. The preferred adsorbents are calcium-exchanged X type zeolite, 5A zeolite and 13X zeolite. If desired, a different adsorbent can be used for hydrocarbon removal than is used for nitrogen removal.

The adsorption is preferably carried out in a battery of two or more adsorption beds arranged in parallel and operated out of phase, so that at least one bed is undergoing adsorption while another is undergoing regeneration. The process of the invention is effective for the removal of up to about 100 total ppm (parts per million parts, by volume) or more of hydrocarbon and nitrogen (when present) from the oxygen product stream.

Upon completion of the adsorption step, flow of the feed gas through the adsorption bed is terminated and the bed is regenerated by passing a warm hydrocarbon-free purge gas therethrough. The purge gas preferably is at a temperature of about −20° to 250° C. The preferred purge gas is the high purity oxygen being produced during the adsorption step.

In another embodiment of the process of the invention an oxygen-containing stream is distilled in a cryogenic distilation system at a temperature in the range of about 90° to 125° K. to produce an oxygen-enriched product stream, and the oxygen-enriched product stream is subjected to a TSA process at cryogenic temperatures to remove hydrocarbons and nitrogen, thereby producing a high purity oxygen product stream, i.e. an oxygen stream containing not more than about 1 ppm each of hydrocarbons and nitrogen. The high purity oxygen stream may be passed to product as a gas, or condensed and passed to product as high purity liquid oxygen.

In a more specific embodiment of the process of the invention substantially hydrocarbon-free oxygen is produced from hydrocarbon-containing air by one of two alternative procedures:

(a) cryogenically distilling the air, thereby producing an oxygen-enriched gaseous stream containing the hydrocarbons (and possibly nitrogen); then adsorbing hydrocarbons and nitrogen (if present) from the oxygen-enriched gaseous stream by passing the oxygen-enriched gaseous stream through a bed of hydrocarbon-selective adsorbent at a temperature between the dew point of oxygen at the prevailing pressure in the adsorption bed and about 150° K., and preferably at a temperature in the range of about 90° to 125° K.; or (b) passing the air stream through a bed of hydrocarbon-selective adsorbent at a temperature between the dew point of air at the prevailing pressure and about 150° K., and preferably at a temperature in the range of about 90° to 125° K., thereby producing substantially hydrocarbon-free air; and cryogenically distilling the substantially hydrocarbon-free air, thereby producing a substantially hydrocarbon-free oxygen-enriched stream.

The apparatus aspect of the invention comprises a cryogenic temperature swing adsorption system in series with a fractional distillation system in either of two alternative arrangements:

(a) a distillation column having an air inlet means, a gaseous oxygen-enriched stream outlet means and a gaseous nitrogen-enriched stream outlet means, and a cryogenic temperature swing adsorption means comprising an adsorbent bed containing at least one adsorbent which more strongly adsorbs hydrocarbons and nitrogen than oxygen, inlet means in fluid communication with the gaseous oxygen-enriched stream outlet means, nonadsorbed product gas outlet means and desorbed product gas outlet means; and (b) cryogenic temperature swing adsorption means comprising an adsorbent bed containing at least one adsorbent which more strongly adsorbs hydrocarbons than nitrogen, oxygen and argon, and having nonadsorbed product gas outlet means and desorbed product gas outlet means, and a distillation column having an air inlet means in fluid communication with the nonadsorbed product gas outlet means, a gaseous oxygen-enriched stream outlet means and a gaseous nitrogen-enriched stream outlet means.

In either apparatus alternative the adsorption means contains an adsorbent selected from A type zeolites, X type zeolites, Y type zeolites, mordenites and mixtures thereof, and in preferred embodiments, an adsorbent selected from calcium-exchanged X zeolite, type 5A zeolite, type 13X zeolite and mixtures thereof.

BRIEF DESCRIPTION OF THE DRAWINGS

The invention is illustrated in the drawings, in which.

Like characters designate like or corresponding parts throughout the several views. Auxiliary valves, lines and equipment not necessary for an understanding of the invention have been omitted from the drawings.

DETAILED DESCRIPTION OF THE INVENTION

Figure 1:
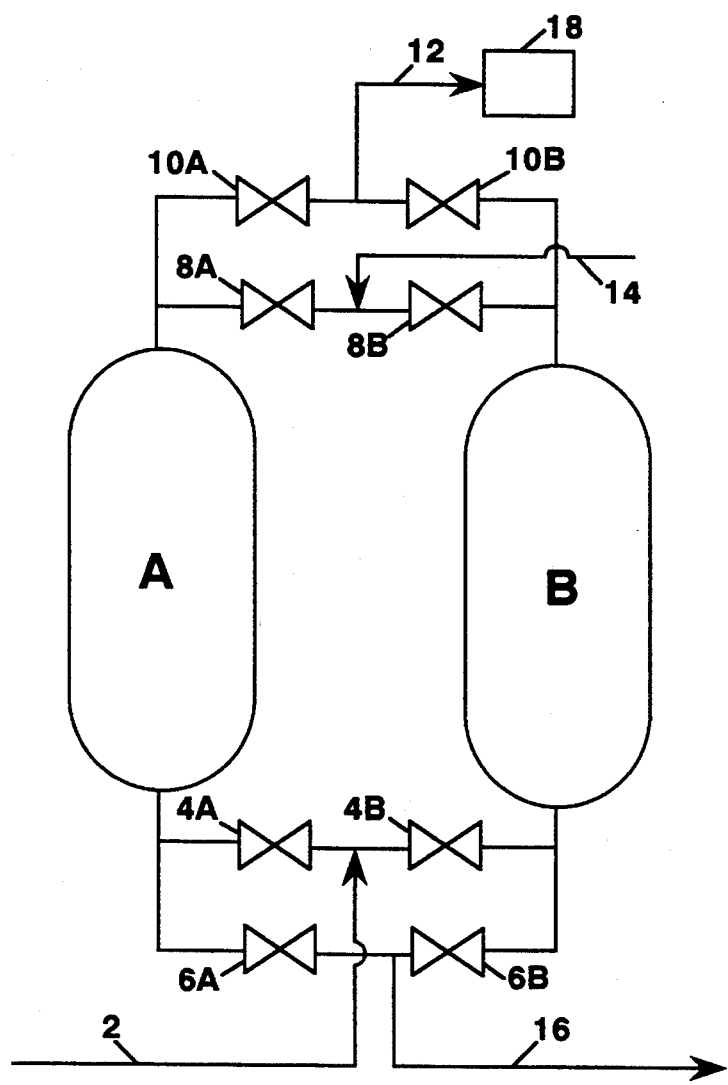
FIG. 1 depicts a cryogenic adsorption system for recovering substantially pure oxygen from an oxygen feed stream in accordance with the principle of the invention.

In the broad aspect of the invention, an oxygen-enriched gas stream containing hydrocarbons and possibly nitrogen as impurities is passed through a bed of adsorbent which preferentially adsorbs hydrocarbons and nitrogen from the oxygen-enriched gas stream at cryogenic temperatures, thereby removing substantial quantities of the hydrocarbons and nitrogen from the gas stream. The adsorption process operates on a TSA cycle. This aspect of the invention can be carried out in the apparatus illustrated in FIG. 1. The adsorption system illustrated in FIG. 1 is depicted as comprising two parallel arranged beds; however the invention is not limited to a two-bed system. A single bed adsorption system can be used, or the system can comprise more than two parallel-arranged adsorption beds. The number of adsorption beds in the system is not critical to the operation of the invention. In the two bed system illustrated in the drawings, one bed is in the adsorption mode while the other bed is in the regeneration mode.

Adsorbers A and B are identical and each is packed with a bed of particulate adsorbent which adsorbs hydrocarbons and nitrogen in preference to oxygen. Suitable adsorbents include A X, and Y type zeolites, mordenites, etc. Preferred adsorbents include calcium-exchanged type X zeolite, 5A zeolite and 13X zeolite.

In the adsorption system illustrated in FIG. 1, valves 4A and 4B control the flow of feed gas to beds A and B, respectively; valves 6A and 6B control the flow of purge gas and desorbed gas from adsorbers A and B, respectively; valves 8A and 8B control the flow of purge gas to adsorbers A and B, respectively; and valves 10A and 10B control the flow of purified oxygen product gas from adsorbers A and B, respectively.

The operation of the adsorption system will first be described with bed A in the adsorption mode and bed B in the regeneration mode. In this half of the cycle, valves 4A, 6B, 8B and 10A are open and valves 4B, 6A, 8A and 10B are closed. Feed gas enters the adsorption system through line 2, passes through valve 4A and enters adsorber A. As the gas passes through adsorber A, hydrocarbons and nitrogen (if present) are preferentially adsorbed therefrom. The hydrocarbon- and nitrogen-depleted oxygen stream, now usually containing no more than about 1 ppm by volume each of hydrocarbons and nitrogen, passes through valve 10A and leaves the adsorption system through line 12. In the embodiment illustrated in FIG. 1, the purified oxygen is sent to unit 18 which represents user equipment such as an ozonizer, a downstream process such as an oxygen liquefier or a storage vessel.

While high purity oxygen is being produced in adsorber A, the bed of adsorbent in adsorber B is being regenerated. During regeneration, a warm purge gas is introduced into adsorber B through line 14 and open valve 8B. It is preferred to use high purity oxygen as the purge gas to avoid contaminating the adsorption beds. Part of the product leaving the system through line 12 can be used as the regeneration purge gas. The warm purge gas passes through bed B, thereby desorbing and sweeping hydrocarbons and nitrogen therefrom. The desorbed hydrocarbons and nitrogen are removed from the system through open valve 6B and line 16. This gas may be completely vented to the atmosphere or a part of it can be reintroduced into the system to recover the oxygen used as purge gas.

During the course of the adsorption step, the adsorbed gas front in adsorber A progresses toward the outlet end of this unit. When the front reaches a predetermined point in the bed, the first half of the cycle is terminated and the second half is begun.

During the second half of the adsorption cycle, adsorber B is put into adsorption service and the bed in adsorber A is regenerated. During this half of the cycle valves 4B, 6A, 8A and 10B are open and valves 4A, 6B, 8B and 10A are closed. Feed gas now enters the adsorption system through line 2 and passes through adsorber B through valves 4B and 10B and line 12. Meanwhile the bed in adsorber A is being regenerated. During regeneration of the bed in adsorber A, the warm purge gas passes through the adsorber A via line 14, valve 8A, valve 6A and line 16. When the adsorption front in the bed in adsorber B reaches the predetermined point in this bed, the second half of the cycle is terminated, and the cycle is repeated.

The feed to adsorbers A and B is typically at a temperature between the dew point of oxygen at the prevailing pressure and about 150° K., and preferably at a temperature in the range of about 90° and 125° K. The prevailing pressure in adsorbers A and B during the adsorption step is generally in the range of about 1.0 to 20.0 atmospheres, absolute. The rate of flow of the regeneration gas through the system is typically between 5 and 15% of the feed flow rate. The regeneration gas temperature is typically in the range of about −20° and 250° C. The concentration of hydrocarbon and nitrogen impurities in the feed gas are typically less than 100 ppm each. Prior to the initial start of oxygen purification, the beds in adsorbers A and B are heated to temperatures up to 300° C. to remove any residual moisture contained therein. This step is not repeated during the regular operation. A typical cycle for the process is given in Table I below.

TABLE I

| Typical Cycle Sequence for the Cryogenic TSA Process of the Invention | |
| --- | --- |
| Step | Time, Hr. |
| Pressurize Bed A, purify using Bed B | 0.5 |
| Purify using Bed A, vent Bed B to atmosphere | 0.5 |
| Purify using Bed A, regenerate Bed B with warm purge gas | 8.0 |
| Purify using Bed A, cool Bed B with cold purge | 15.0 |
| Pressurize Bed B, purify using Bed A | 0.5 |
| Purify using Bed B, vent Bed A to atmosphere | 0.5 |
| Purify using Bed B, regenerate Bed A with warm purge gas | 8.0 |
| Purify using Bed B, cool Bed A with cold purge gas | 15.0 |
| Total | 48.0 hr |

Figure 2:
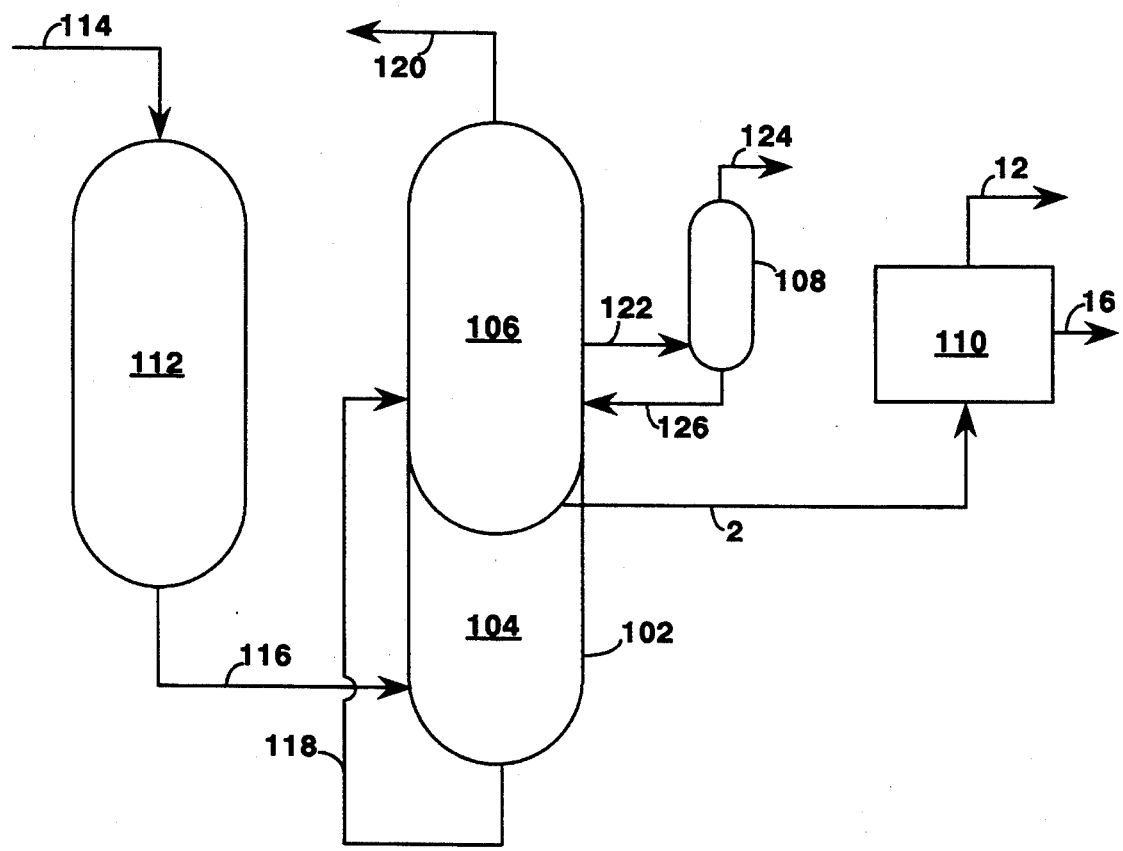
FIG. 2 illustrates a first embodiment of a system in accordance with the invention for producing high purity oxygen from air.

In a more specific aspect of the invention, illustrated in FIG. 2, a stream of air containing one or more gaseous hydrocarbons is distilled in a distillation column to produce an oxygen-enriched product stream containing the gaseous hydrocarbons and possibly small amounts of nitrogen, and the oxygen-enriched product stream is then subjected to the above-described cryogenic temperature swing adsorption process.

Turning now to FIG. 2, the system illustrated therein includes cryogenic distillation unit 102, comprising high pressure column 104 and low pressure column 106, side arm argon distillation unit 108 (optional), cryogenic adsorption system 110, which can be identical to the system illustrated in FIG. 1, and an air prepurification unit 112.

In the operation of the system of FIG. 2, a compressed stream of air is introduced into prepurification unit 112 through line 114. Unit 112 is typically an adsorptive purification unit or a reversing heat exchanger. When it is an adsorptive purification unit it contains a bed of adsorbent which preferentially adsorbs moisture and carbon dioxide from the air stream. As the air stream passes through unit 112, unsaturated hydrocarbons such as ethylene, propylene, etc. and higher molecular weight saturated hydrocarbons, for example $C_4$ and higher alkanes, are also generally adsorbed from the air stream. Hydrocarbons remaining in the stream exiting unit 112 include methane, ethane, and traces of ethylene and propane. When a reversing heat exchanger is used, water and carbon dioxide (but generally not hydrocarbons) are removed from the feed air by freezing as the air passes through the unit. The pre-purified air stream leaving unit 112 is cooled and then introduced into high pressure column 104 of unit 102 via line 116. A liquefied oxygen-rich bottoms stream is removed from high pressure column 104 through line 118 and introduced into low pressure column 106. The oxygen-rich stream is rectified in column 106 into a nitrogen product stream, which leaves column 106 through line 120, and a relatively pure oxygen product stream, which leaves column 106 through line 2.

When unit 102 is equipped with argon side arm distillation column 108, an argon-rich stream is removed from low pressure column 106 via line 122 at a point intermediate nitrogen product stream removal line 120 and oxygen product removal line 2. In column 108, the argon-rich stream is rectified into a crude argon stream, which leaves column 108 through line 124, and an oxygen-rich recycle stream, which is returned to column 106 through line 126.

The oxygen-rich product stream leaving column 106 through line 2 contains at least the low molecular weight hydrocarbons such as methane, ethane and propane that were not adsorbed from the air feed stream in prepurification unit 112, and perhaps all of the hydrocarbons in the feed air (if unit 112 is a reversing heat exchanger). This stream also generally contains small amounts of nitrogen. These impurities are removed from the oxygen product stream in unit 110, as described above with reference to FIG. 1, thereby producing the hydrocarbon- and nitrogen-depleted oxygen stream that leaves unit 110 through line 12, and a waste stream which leaves unit 110 through line 16. Part of the waste stream may be returned to the distillation column 102 for enhanced oxygen recovery, if desired. For efficient operation of adsorbers A and B, the stream entering the adsorbers should be in the vapor form. To ensure this, the oxygen stream leaving column 106 may be warmed by heat exchange to vaporize the liquid therein prior to sending it to unit 110. The operating conditions for cryogenic adsorption system 110 in this embodiment include a temperature between 90° and 150° K. and a pressure between 1.0 and 20.0 atmospheres.

Figure 3:
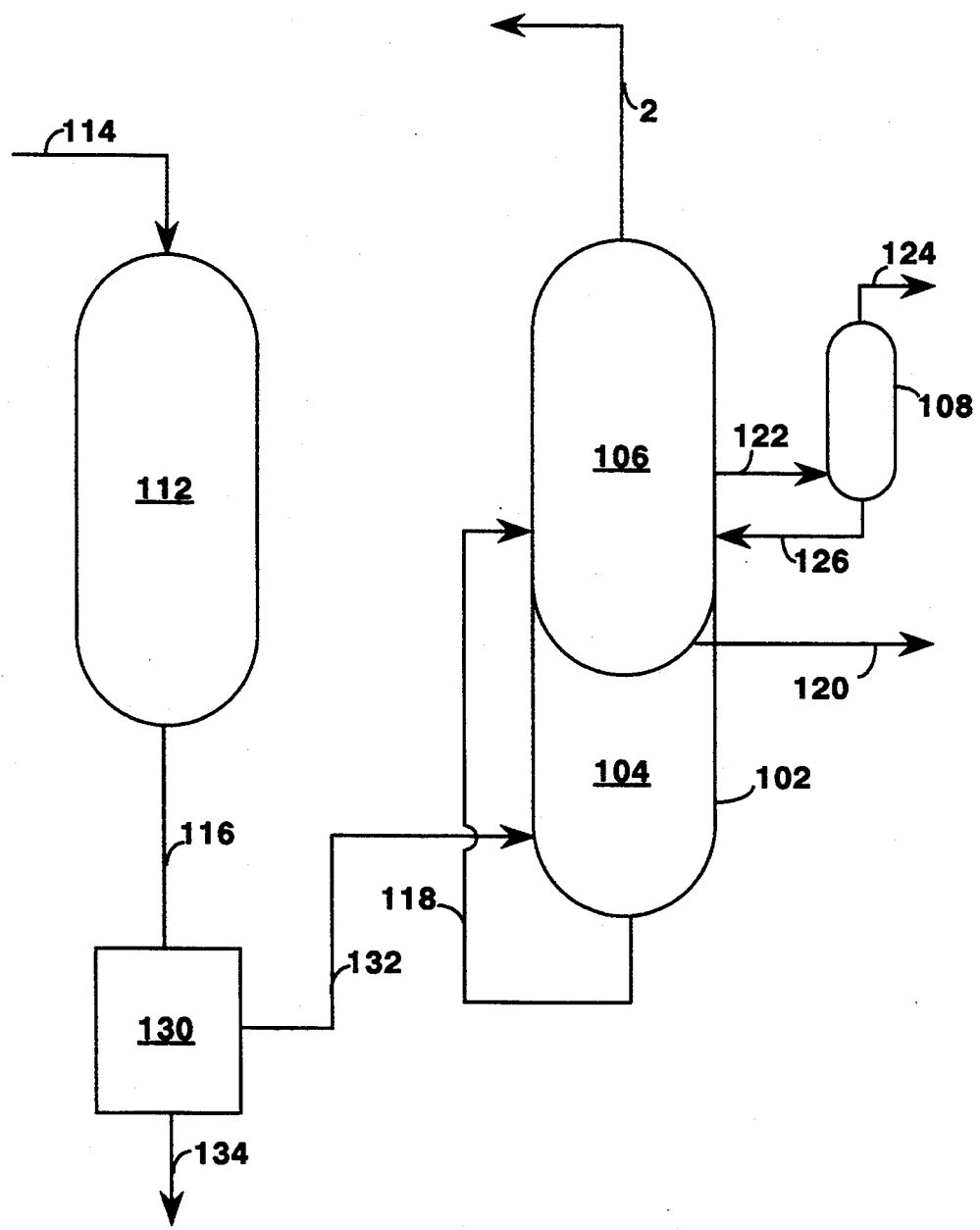
FIG. 3 illustrates a second embodiment of a system in accordance with the invention for producing high purity oxygen from air.

The system of FIG. 3 is similar to the system of FIG. 2 except that adsorption unit 110 of FIG. 2 is eliminated and replaced by cryogenic adsorption unit 130 of FIG. 3. Unit 130 can be the adsorption system illustrated in FIG. 1, and generally contains the same adsorbents. At cryogenic temperatures these adsorbents adsorb hydrocarbons more strongly than nitrogen, oxygen and argon.

In the operation of the system of FIG. 3, a compressed stream of air is introduced into prepurification unit 112 through line 114. Unit 112 removes moisture, carbon dioxide and perhaps unsaturated and higher saturated hydrocarbons from the air stream (when this unit is an adsorption unit). The pre-purified air stream leaving unit 112 is cooled and then introduced into cryogenic adsorption unit 130. The hydrocarbons remaining in the pre-purified air stream are removed therefrom in unit 130, as described above with reference to FIG. 1, thereby producing a hydrocarbon-depleted air stream, which leaves unit 130 through line 132, and a waste stream which leaves unit 130 through line 134. The hydrocarbon-depleted pre-purified air stream next enters high pressure column 104 of unit 102. The operation of unit 102 in FIG. 3 is the same as the operation of this unit in FIG. 2, except that the oxygen-enriched product exiting low pressure column 106 is now substantially hydrocarbon-free and thus requires no further purification.

For efficient operation of unit 130 the prepurified air stream entering this unit should be in the vapor form. Accordingly the prepurified air feed stream to unit 130 should be between the dew point of air at the prevailing pressure in this unit and about 150° K. The preferred operating conditions for cryogenic adsorption system 130 in this embodiment include a temperature between about 90° and 125° K. and a pressure between 1.0 and 20.0 atmospheres.

The invention is further exemplified by the following examples, in which parts, percentages and ratios are on a volume basis, unless otherwise indicated.

EXAMPLE I

Commercially available 5A zeolite, NaY zeolite, 13X zeolite and CaX zeolite were chromatographically evaluated for oxygen, hydrocarbon(s) and nitrogen separation. In these experiments, three foot columns of ⅛ inch diameter were packed with 60–80 mesh adsorbent particles. The columns were regenerated at a temperature of 250° C. in a gas chromatograph (GC) equipped with a thermal conductivity detector (TCD) and a flame ionization detector (FID). The columns were then cooled first to ambient temperature and then to a temperature of 87° K. by placing them in a dewar container containing liquid argon at one atmosphere pressure. Helium at a flow rate of 30 cc/min was used as the carrier gas. A one ml sample containing 0.1% $N_2$, 200 ppm methane and the balance oxygen was injected into the column and the effluent from the column was analyzed first for oxygen and nitrogen (with the TCD) and then for methane (with the FID). For all the adsorbents oxygen was the first to elute followed by nitrogen and then methane, indicating selective adsorption of nitrogen and hydrocarbons over oxygen. CaX and 5A zeolites showed higher selectivity compared to the other adsorbents tested.

EXAMPLE II

To determine the dynamic hydrocarbon adsorption capacity, a 2" vessel containing 930 gms of a 5A zeolite manufactured by UOP in U.S.A. was regenerated with hydrocarbon free argon at a temperature of 250° C. to remove residual moisture. The vessel was then immersed in liquid argon to cool it to a temperature of 87° K. Impure oxygen at a pressure of 10 psia was passed through the bed at an average flow rate of 7.4 slpm (standard liters per minute-standard conditions refer to 20° C. and one atmosphere pressure, absolute). The feed oxygen contained about 30 ppm total hydrocarbons (as methane). The hydrocarbon concentration in the effluent from the adsorber vessel was measured continuously using a GC with a FID having a hydrocarbon detection limit of 0.1 ppm. The vessel was operated for a period of 102 hours without haydrocarbon breakthrough at the bed outlet (<0.1 ppm).

EXAMPLE III

The vessel used in Example II was filled with 930 gms of a CaX zeolite manufactured by UOP in U.S.A., and the adsorbent was then regenerated with hydrocarbon-free argon at a temperature of 250° C. to remove residual moisture. The vessel was then immersed in liquid argon (45 psig pressure) at a temperature of 103° K. Impure oxygen at a pressure of 30 psig and containing about 50 ppm total hydrocarbons (as methane) was passed through the bed at an average flow rate of 20 slpm. The hydrocarbon concentration in the effluent from the adsorber vessel was measured continuously using a Beckman Total Hydrocarbon Analyzer with a hydrocarbon detection limit of 0.01 ppm. The vessel was operated for a period of 30 hours without hydrocarbon breakthrough at the bed outlet (<0.01 ppm).

Although the invention is described with reference to specific examples, the scope of the invention is not limited thereto. For example, the invention can be used to remove hydrocarbons from other oxygen-based gases. Nitrogen can also be removed at conditions like those in Examples II and III. The scope of the invention is limited only by the breadth of the appended claims.

What is claimed is:

1. A temperature swing adsorption process for removing impurities selected from the group consisting of hydrocarbons, nitrogen and mixtures thereof from a gaseous oxygen feed stream comprising the step of passing said feed stream through a bed of hydrocarbon- and nitrogen-selective adsorbent at a temperature below about 150° K., thereby producing a substantially hydrocarbon- and nitrogen-free oxygen product stream.

2. A temperature swing adsorption process for removing hydrocarbons from a gaseous air stream containing at least one hydrocarbon as an impurity comprising the step of passing said gaseous air stream through a bed of hydrocarbon-selective adsorbent at a temperature below about 150° K., thereby producing a substantially hydrocarbon-free air stream.

3. The process of claim 1 or claim 2, wherein said adsorbent is selected from type A zeolite, type X zeolite, type Y zeolite, mordenite and mixtures thereof.

4. The process of claim 1 or claim 2, wherein said adsorbent is selected from calcium-exchanged X zeolite, 5A zeolite, 13X zeolite and mixtures thereof.

5. The process of claim 1 or claim 2 further comprising regenerating said adsorbent at a temperature in the range of about −20° to 250° C., thereby desorbing said impurities from said adsorbent.

6. The process of claim 1, wherein said oxygen feed stream contains up to about 100 ppm total hydrocarbons.

7. The process of claim 2, wherein said air stream contains up to about 100 ppm total hydrocarbon.

8. The process of claim 1 or claim 2, carried out at an absolute pressure in the range of about 1.0 to 20 atmospheres.

9. The process of claim 1 or claim 2 carried out in a plurality of adsorption beds operated out of phase with one another such that at least one bed is undergoing adsorption while at least one other bed is undergoing desorption.

10. The process of claim 1 or claim 2, wherein said at least one hydrocarbon has 1 to 3 carbon atoms.

11. A temperature swing adsorption process for producing an oxygen product stream containing not more than 1 ppm hydrocarbon from air containing up to about 100 ppm of total hydrocarbons as impurities comprising the steps of:
   (a) cryogenically distilling said air, thereby producing an oxygen-enriched gaseous stream containing said hydrocarbons; and
   (b) adsorbing hydrocarbons from said oxygen-enriched gaseous stream by passing said oxygen-enriched gaseous stream through a bed of hydrocarbon-selective adsorbent at a temperature below about 150° K.

12. A temperature swing adsorption process for producing an oxygen product stream containing not more than 1 ppm hydrocarbon from an air stream containing up to about 100 ppm hydrocarbons as an impurity comprising the steps of:

(a) passing said air stream through a bed of hydrocarbon-selective adsorbent at a temperature below about 150° K., thereby producing substantially hydrocarbon-free air; and (b) cryogenically distilling the substantially hydrocarbon-free air, thereby producing a substantially hydrocarbon-free oxygen-enriched stream.

13. The process of claim 11 or claim 12, wherein the cryogenic distillation step is carried out at a temperature in the range of about 90° to 125° K.

14. The process of claim 11 or claim 12, wherein the adsorption step is carried out at an absolute pressure of about 1 to 20 atmospheres.

15. The process of claim 11 or claim 12, wherein said adsorbent is selected from type A zeolite, type X zeolite, type Y zeolite, mordenite and mixtures thereof.

16. The process of claim 11 or claim 12, wherein said adsorbent is selected from calcium exchanged X zeolite, 5A zeolite, 13X zeolite and mixtures thereof.

17. The process of claim 11 or claim 12, wherein said hydrocarbons have 1 to 3 carbon atoms.

18. Apparatus for producing high purity oxygen from air which contains hydrocarbon as an impurity comprising:

(a) a distillation column having an air inlet means, a gaseous oxygen-enriched stream outlet means and a gaseous nitrogen-enriched stream outlet means; and (b) cryogenic temperature swing adsorption means comprising an adsorbent bed containing at least one hydrocarbon-selective adsorbent, inlet means in fluid communication with said gaseous oxygen-enriched stream outlet means, nonadsorbed product gas outlet means and desorbed product gas outlet means.

19. Apparatus for producing high purity oxygen from air which contains hydrocarbon as an impurity comprising:

(a) cryogenic temperature swing adsorption means comprising an adsorbent bed containing at least one hydrocarbon-selective adsorbent and having nonadsorbed product gas outlet means and desorbed product gas outlet means; and (b) a distillation column having an air inlet means in fluid communication with said nonadsorbed product gas outlet means, a gaseous oxygen-enriched stream outlet means and a gaseous nitrogen-enriched stream outlet means.

20. The apparatus of claim 18 or claim 19, wherein said at least one hydrocarbon-selective adsorbent is selected from A type zeolites, X type zeolites, Y type zeolites, mordenite and mixtures thereof.

21. The apparatus of claim 18 or claim 19, wherein said at least one hydrocarbon-selective adsorbent is selected from calcium exchanged X zeolite, type 5A zeolite, type 13X zeolite and mixtures thereof.

22. The apparatus of claim 18 or claim 19, wherein said distillation column additionally has a crude argon side arm distillation column.

* * * * *